Sept. 2, 1947.  R. LOPEZ-IRIZARRY  2,426,834
FOOD PRODUCT
Filed April 3, 1947
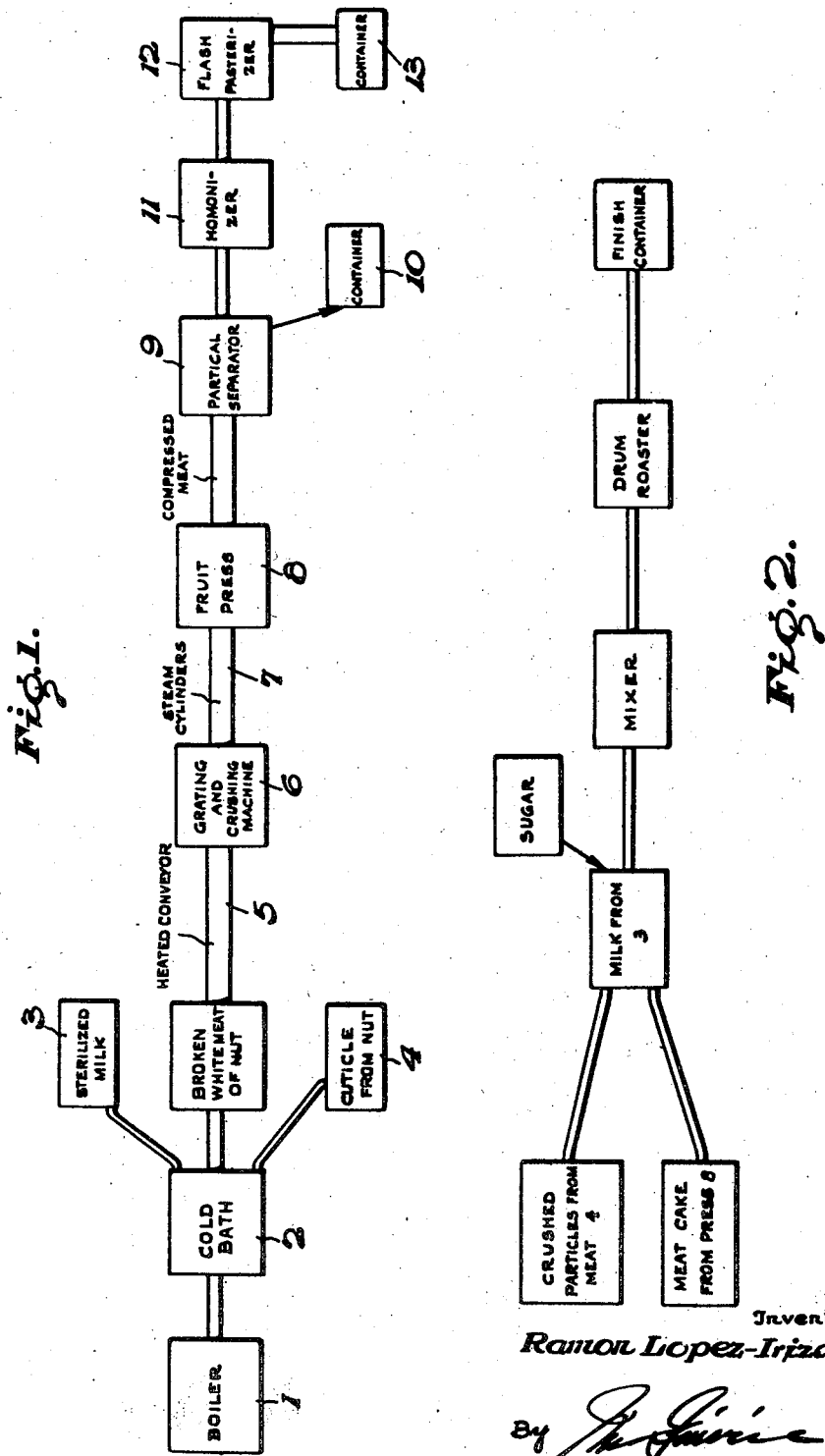
Inventor:
Ramon Lopez-Irizarry
By
Attorney Patented Sept. 2, 1947

2,426,834

UNITED STATES PATENT OFFICE 2,426,834

FOOD PRODUCT

Ramon Lopez-Irizarry, San Juan, Puerto Rico

Application April 3, 1947, Serial No. 739,048

3 Claims. (Cl. 99—125)

This invention is directed to a method of producing a food product by utilizing essential parts of fresh cocoanuts treated and combined in a manner to produce edible compounds maintained indefinitely in the original fresh and palatable flavor of the cocoanut.

Various attempts have been previously made to preserve the edible portions of the cocoanut in a form suitable for commercial use, but all such known to me fail materially in preserving the original condition as defined in the processes of this invention, taste and edibility of the fresh nut parts, and hence the real taste, flavor, and condition of the original fresh cocoanut are substantially lost. Cocoanut meat when exposed to air and light rapidly deteriorates in flavor, and has not, up to the present, so far as known, been preserved for indefinite storage without sacrificing the original and highly desirable characteristics.

The present invention is directed to a process of treating the full contents of the nut or kernel under certain successive steps to produce a product having all the freshness, delicate flavor and taste of the fresh cocoanut, and more importantly, produce a product which will remain in its original fresh, and natural condition indefinitely, as a commercial product.

The invention contemplates a process using the cocoanut meal residue of the main process, together with or without certain other edible parts to produce a further food product having the desirable characteristics and flavor of the cocoanut.

The respective processes involve the use of certain well-known mechanical elements, and as such are or may be conventional, as will be illustrated diagrammatically in the accompanying drawings and identified by legends.

In the drawings:

Figure 1 is a diagrammatic view of the details used in carrying out the first process; and Figure 2 is a similar view of the details used in carrying out the second process.

In carrying out the described processes, matured cocoanuts in the shell are steamed or boiled for approximately twenty minutes in a steam or water bath as in 1, and then immediately subjected to a cold bath, as in cooler 2, which serves to refresh the nut. The nut is then broken open and the juice or so-called milk in liquid form in the center cavity of the nut is separated and temporarily stored in a sterilized container 3 for use in the second process. The nut proper is then separated from its shell, and the brown cuticle or skin is separated in a container 4.

The white meat of the cocoanut is moved through a heated conveyor 5 to a crushing machine 6, and after crushing is delivered through a heated conveyor 7 to a fruit or like press 8. In this press the meat yields a thick cream-like juice, which is delivered to a separator 9, for cleaning out coarse particles. The meal cake left in the fruit press 8 is delivered therefrom to a separate container 10, for use in the second process.

The strained fruit juice is delivered to a homogenizer 11 where it is mixed with sucrose in proportions necessary to bring the specific gravity of the final product to 1.2296, which is the equivalent of fifty per cent total solids in solution. The density of the creamy meat juice may range from 1.0139 to 1.0219, determined on the maturity of the cocoanuts used. Thus, the critical ratio between the juice and the sugar must be fixed to obtain a balanced solution, as in a ratio of 10:9. It will thus be understood that the creamy meat juice of the cocoanut is mixed with sucrose in proportions that shall not exceed 10 parts of juice to 9 parts of sugar, so that the specific gravity of the solution will not be higher than 1.2296, that is, the equivalent of 50% total solids in solution, taking into consideration that the creamy meat juice may range from 1.0139 to 1.0219, determined by the maturity of the cocoanuts used. Thus, the critical ratio between the juice and sugar must be fixed to obtain a balanced solution at its highest viscosity, as in a ratio of 10:9. The homogenized product is delivered to a heated flash pasteurizer 12. The pasteurizer is maintained at approximately 98° C., primarily to avoid any possible separation of the oil otherwise incident to excessive heat conditions. Thus it will be seen that the homogenized product is delivered from the pasteurizer at a temperature not to exceed 98° C. when the critical ratio between the juice and the sugar has been fixed as at 10:9 to primarily avoid any possible separation of the cocoanut oil, which would be otherwise incident to excessive heat conditions. The creamy mixture is delivered from the pasteurizer into sealed containers 13 to their full capacity, hermetically sealed at once and immediately cooled for approximately 20 to 30 minutes in a cooling tank open to running cold water, for vacuum-producing effect, leaving the product substantially free of permanent air content. The container in which the product is finally packed must of course, be impervious to light. This product may be used at any time in substitution of the fresh juice of the cocoanut meat in the preparation of bakery or confectionery products, as well as for making ice cream, sherbets, refreshments or alcoholic drinks such as cocktails, etc. It will be delicious also as a dressing over sponge cake, flavored cake, pancakes and waffles or when used as a food or condiment in any other way desired, or suited for.

The processing residues accounted for in the preceding process, consisting of the juice (milk) coming from the interior cavity of the nuts and held in container 3, and the press cake resulting from the pressed crush after the thick, creamy juice is extracted, held in container 10, is treated as follows:

The second process is thus dependent on the first process in that the materials of the second process use by-products of the first process. Therefore the disclosure of both processes, which are described separately, may be in effect a single treatment of cocoanut meat for the production of relatively-different food products.

The so-called second process utilizes the cocoanut meal. This cocoanut meal is weighed to determine the amount of sugar to be added, and the sugar is usually in equal part with the cocoanut meal or in one-half the weight of the cocoanut meal, though other proportions of sugar or the use of no sugar at all, according to the final use of the product, may vary in this process.

The sugar is first melted in the juice (milk) rejected to container 3 of the first process, and then added for a thorough mixing with the solids noted, under a heated condition to produce a substantially complete dehydration. The oil content of the cocoanut meal blends with the melted sugar to form a coating on the solids. The mass as so far treated is then packed under applied pressure, while hot, in containers impervious to light and under seal to prevent absorption of moisture.

This product may be used as a breakfast food when served with cream or milk, or as a topping for ice cream, puddings or cakes, or may be eaten directly as a delicious confection. As a food product it is of a high nutritive value, rich in minerals, protein, fat and digestible carbohydrates.

This application is filed as a continuation-in-part of my application filed March 25, 1946, Serial No. 656,999.

I claim:

1. A process of producing an edible cocoanut food product consisting in freeing the meat of the cocoanut from the shell, grating and crushing the same, expressing the crushed meat to express the creamy juice of the cocoanut, subjecting the creamy juice to straining, homogenizing the creamy juice and mixing the same with sucrose in proportions that are approximately 10 parts of creamy juice to 9 parts of sugar, to thereby bring the specific gravity of the mixture to approximately 1.2296, that is, within the equivalent of fifty per cent total solids in the mix.

2. A process of producing an edible cocoanut food product consisting in freeing the meat of the cocoanut from the shell, grating and crushing the same, expressing the crushed meat to express the creamy juice of the cocoanut, subjecting the creamy juice to straining, homogenizing the creamy juice and simultaneously mixing the same with sucrose in proportions that are approximately 10 parts of creamy juice to 9 parts of sugar to bring the specific gravity of the mixture to approximately 1.2296, that is, within the equivalent of fifty per cent total solids in the mix, and passing the mix through a pasteurizer, at a maximum temperature of 98° C.

3. A process of producing an edible cocoanut food product consisting in freeing the meat of the cocoanut from the shell, grating and crushing the same, expressing the crushed meat to express the creamy juice of the cocoanut, subjecting the creamy juice to straining, homogenizing the creamy juice and simultaneously mixing the same with sucrose to a homogeneous mixture of 10 parts cocoanut creamy juice to 9 parts sugar.

RAMON LOPEZ-IRIZARRY.

REFERENCES CITED

The following references are of record in the file of this patent:

UNITED STATES PATENTS

| Number | Name | Date |
|---|---|---|
| 1,366,339 | Alexander | Jan. 25, 1921 |
| 1,348,689 | Baker | Aug. 3, 1920 |
| 1,444,408 | Willison | Feb. 6, 1923 |

OTHER REFERENCES

"Food Industries," October, 1928, article entitled "Desiccating Shredded Coconut" by A. E. Buchanan, pages 9-12.